June 9, 1953
R. H. DICKE
2,641,409
METHOD AND APPARATUS FOR COUNTING
SELECTED ELECTRICAL TRANSIENTS
Filed July 16, 1948
2 Sheets-Sheet 1
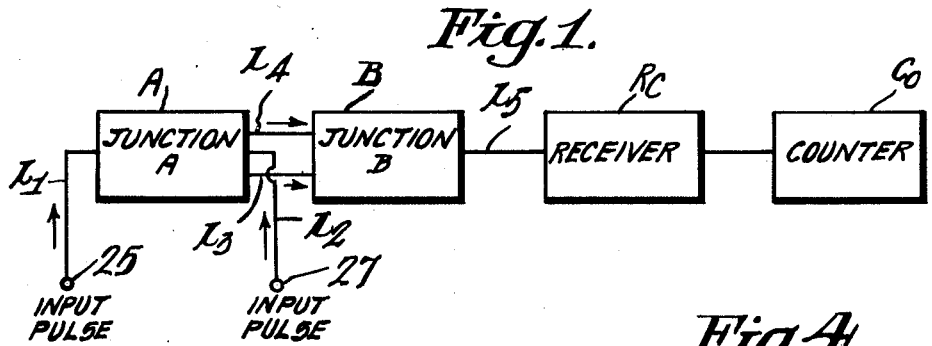
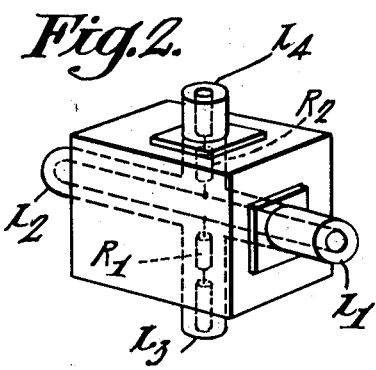
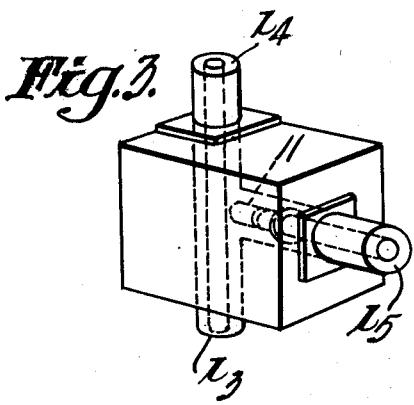
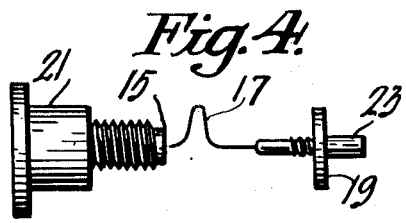
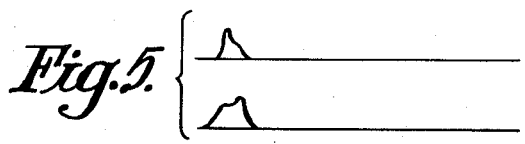
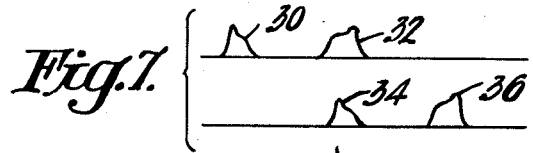
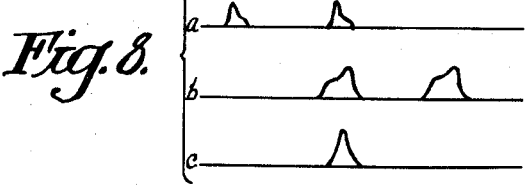
INVENTOR
Robert H. Dicke
BY
J. L. Whittaker
ATTORNEY

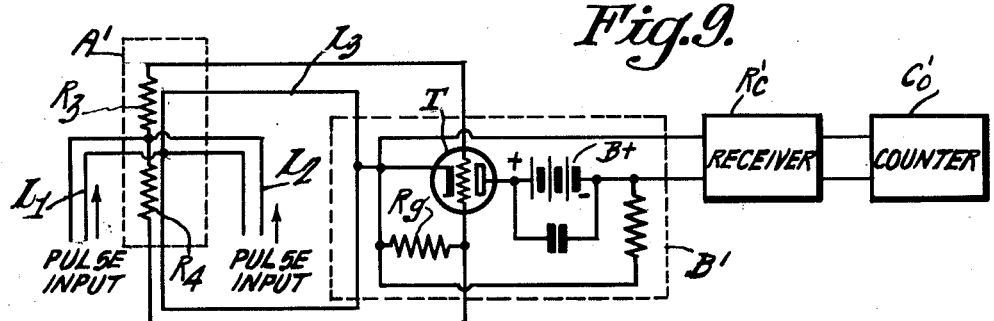
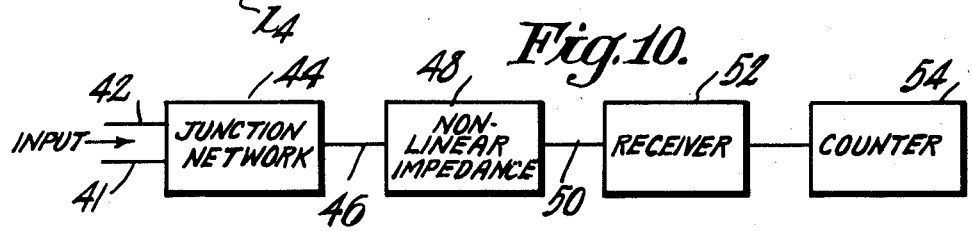
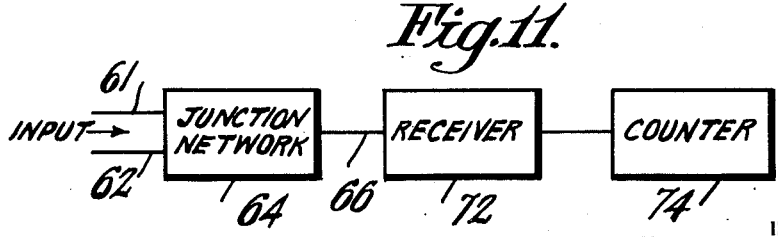

Patented June 9, 1953

2,641,409

UNITED STATES PATENT OFFICE 2,641,409

METHOD AND APPARATUS FOR COUNTING SELECTED ELECTRICAL TRANSIENTS

Robert H. Dicke, Princeton, N. J.

Application July 16, 1948, Serial No. 39,164

33 Claims. (Cl. 235—92)

This invention relates to pulse coincidence circuits and more generally, to apparatus and a method for distinguishing between the occurrence or non-occurrence of selected transient groups of at least one electrical impulse.

It is frequently desirable to utilize pulse coincidence circuits which have a high resolving time, good discrimination against non-coincident pulses, and which accept coincidence pulses rapidly, that is, have a quick recovery time. The desirable properties of Cerenkov radiation counters, which are primarily coincidence counters, are more fully pointed out in my paper published in The Review of Scientific Instruments, vol. 18, No. 12, pages 907 to 914, December 1947. Coincidence counters are also employed to detect certain types of nuclear atomic reaction to incident rays, for example, where the direction and energy of the incident rays is known, the resultant reaction radiation from a particle split under given conditions may be emitted in two known directions.

A coincidence counter may then be used to determine those emitted radiations occurring in coincidence at the calculated angles, to the general exclusion of background counts to give a count of the radiation due to a specified type of reaction and hence a count of the reaction occurrences. These and other important applications make the coincidence counter circuit one of the most valuable instruments in the hands of the modern physicist, especially in the field of atomic physics. The same properties, generally speaking, which are pointed out as desirable in my said article, are desirable in most coincidence counters.

In the past, coincidence counters having these desirable features required expensive, carefully constructed and designed electronic circuits, critical in adjustment and operation. Moreover, even such circuits often failed to operate with sufficient speed.

It is an object of the present invention to provide an improved counter for counting pairs of electrical impulses separated by a predetermined time interval, which may be zero in the case of the usual coincidence counter.

It is another object of the present invention to simplify the construction of high speed coincidence counter circuits.

It is a further object of the invention to provide a coincidence counter circuit of high resolving power, that is, one which is capable of determining coincidence counts of very short, sharp pulses.

It is another object of the invention to provide a highly discriminatory coincidence counter circuit which will discriminate successfully against non-coincident pulses.

It is further an object to provide a circuit and a method which will respond to coincident pulses and fail to respond to non-coincident pulses even when the heights and widths of the incoming pulses vary greatly from pulse to pulse.

It is a further object of the invention to provide a method, and circuits for practicing the method, of discriminating either for or against, transient groups of unidirectional electrical impulses. By a transient group of such impulses is meant a discrete number of one or more impulses which, in practice, can be considered as resolved into a continuous frequency spectrum of sinusoidal components in which the first occurring (or lowest) frequency of minimum amplitude occurs at a frequency substantially greater than zero.

These and other objects, advantages, and novel features of the invention will become more fully apparent from the following description when read in connection with the accompanying drawing, in which:

Fig. 1 is a schematic view of a preferred form of a pulse coincidence counter circuit according to the invention;

Fig. 2 is a perspective view of a junction between four coaxial transmission lines of Fig. 1;

Fig. 3 is a perspective view of another of the junctions shown in Fig. 1 including a crystal rectifier thereof;

Fig. 4 is a side view of the crystal rectifier of Fig. 3;

Figs. 5, 6, 7, and 8 are graphs useful in an understanding of the invention;

Fig. 9 is another embodiment of the invention employing open wire transmission line;

Fig. 10 is a schematic diagram of another embodiment of the invention discriminating in favor of coincident pulses;

Figs. 10a, 10b, 10c, and 10d are diagrams useful in understanding the operation of the circuit of Fig. 10; and Fig. 11 is a schematic diagram of still another embodiment of the invention discriminating against coincident pulses and counting non-coincident pulses.

Certain scientific principles which have long been known, but which have not heretofore been usefully employed in coincidence counters, are used in the invention. For example, among these well-known principles is one relating to unidirectional electrical impulses. It is known that a transient group at least one impulse may be considered and analyzed as constituted by a continuous frequency spectrum of simple harmonic electrical oscillations, having one or more frequencies of minimum amplitude. For example, in the idealized case of one or two square wave impulses, the first occurring minimum amplitude frequency is zero amplitude. Another principle employed in the invention is one relating to non-linear impedances and stating that if two electrical oscillations are passed simultaneously through a non-linear impedance, the resultant output will have components of frequencies not to be found in either of the original components. Again, important utilization is made of certain theories relating to four terminal-pair networks, a single terminal pair being here understood to represent the termination of an open two-wire transmission line, wave guide, or a coaxial transmission line.

In accordance with a preferred form of the invention, from each of the electrical impulses of predetermined time relationships which are to be counted are derived a pair of electrical impulses spaced apart in time by $1/2f_0$ seconds. Each transient group of a pair of derived impulses is fed to a non-linear impedance with one pair spaced in time $1/2f_0$ seconds from the other pair. A receiver tuned to the frequency $f_0$ receives the output from the non-linear impedance, and a counting device receiving the receiver output is thereby actuated only when the desired time spacing is preserved, and is non-actuated when the desired time spacing fails, barring accidental responses, as explained more fully hereinafter. More broadly, in the preferred embodiment I combine the impulses, whose coincidence or noncoincidence is to be observed. From the combined impulses is derived a group of impulses having predetermined minimum frequencies in the presence or absence of a known time relationship between the impulses of the derived group. The frequency components at the predetermined minimum frequency are detected by a receiver to produce a count only when components of the predetermined frequency are present in the derived pattern of impulses. Thus, the derived count discriminates for or against a derived pattern of impulses, and accordingly for or against an initial known time relationship between the initial impulses.

So far as I am aware, pulse discrimination between transient groups of electrical impulses based on the resolution of impulses into a continuous spectrum of sinusoidal frequencies and utilizing the knowledge of the resultant minimum amplitude frequencies has not been practiced prior to my invention. More simply, Fourier analysis into sinusoidal components has not been employed in transient pulse discrimination or counting.

Referring now more particularly to Fig. 1, which is a schematic diagram of a preferred embodiment of the invention, $l_1$ and $l_2$ are coaxial transmission lines, in this case having like characteristics and having a difference in line lengths equal to $\lambda_0/2$, $\lambda_0$ being a wavelength along the line corresponding to a frequency $f_0$. The use of two-conductor transmission lines, such as coaxial cable or open wire transmission line is highly preferred because the wave velocity and characteristic impedance of two-conductor lines may be independent of frequency. If waveguides are used, or coaxial lines operated in other than the dominant mode, unnecessary difficulties are introduced by distortion of the pulse in its travel along the line because of the varying phase velocity along the line, although use of waveguide is not impossible. The determination of $\lambda_0$ and $f_0$ will be more fully apparent hereinafter, and will be explained in connection with the operation of the device. Lines $l_1$ and $l_2$ terminate in a junction network A linear and passive in character from which lead coaxial transmission lines $l_3$ and $l_4$, again in this case having like characteristics and having a difference in line lengths of $\lambda_0/2$. Lines $l_3$ and $l_4$ terminate at junction B from which leads line $l_5$, a coaxial transmission line, to a receiver $R_c$ which may include an amplifier. Junction B includes a non-linear impedance through which pulses from $l_3$ and $l_4$ must pass to reach $R_c$, the receiver. Receiver $R_c$ has a definite passband of width say $\Delta f_0$ about frequency $f_0$. A counter $C_0$ receives the output from receiver $R_c$ and counts any electrical reactions from the receiver.

Fig. 2 is a perspective view of a preferred form of junction A. $R_1$ and $R_2$ are similar carbon resistors of substantially the same values inserted at points symmetrical with and closely adjacent to a plane of symmetry extending through lines $l_1$ and $l_2$. $R_1$ and $R_2$ are chosen with resistance equal to the characteristic impedance of each line assumed to be equal.

Fig. 3 is a perspective view of junction B wherein a crystal rectifier 11 is inserted at the termination of line $l_5$ with the junction. The crystal may be designed to have a quick recovery time of the order of $10^{-10}$ seconds, and is, therefore, especially suited for utilization where closely recurring pulses of short duration are involved. In Figs. 2 and 3, lines $l_1$, $l_2$, $l_3$ and $l_4$ are shown terminating in conventional connectors, it being understood that these are plugged into their mating connectors to continue the line to the desired lengths between or away from the junctions. Fig. 4 shows in greater detail how the crystal is inserted in the central conductor of line $l_5$ at the junction and comprises a silicon wafer 15, a tungsten wire 17 in contact therewith, a wire support 19, and a connector 21 to insert in and make contact with the central conductor of line $l_5$. The portion 23 is connected to the junction of the central conductors of line $l_3$ and $l_4$ at junction B.

Figs. 5, 6, 7 and 8 will be helpful in understanding the operation of the device. First consider any single impulse having a width in time preferably greater than the relaxation time of the non-linear impedance or crystal rectifier, that is, the time required for the rectifier to return substantially completely to a no-signal condition. Both the pulse length and relaxation time should be less than $1/2f_0$. Such a pulse proceeds from the terminal 25 or 27 of line $l_1$ (or $l_2$) to junction A. Here, the pulse is partly reflected and partly transmitted. Pulses identical with each other in amplitude and shape, and similar in shape to the initial pulse incident at junction A, are transmitted through lines $l_3$ and $l_4$. These pulses are delayed along one line, say $l_3$ by a time $1/2f_0$ seconds, since one line is a half-wavelength longer than the other for frequency $f_0$. There arrive, then, at junction B two identical pulses, separated in time by $1/2f_0$ seconds. It will be assumed that these are separately passed by the non-linear impedance or rectifier because of its quick recovery time, to produce two separate pulses, similar in shape and separated by $1/2f_0$ in time. If the wave shapes are idealized as rectangular in form, it is readily proved by Fourier analysis that this pair of pulses has no frequency component, or a null frequency component, at the frequency $f_0$ to which, as pointed out hereinbefore, the receiver $R_c$ is tuned. By similar analysis, it is readily proved that such a null frequency $f_0$, or lack of frequency component at the frequency $f_0$, exists for any two pulses similar in shape and amplitude and separated in time by $1/2f_0$. Moreover, because of the continuity of the spectrum of frequencies representing the pair of pulses, it is apparent that with a sufficiently narrow bandwidth, the receiver $R_c$ will fail to pass a sufficient impulse to actuate the counter $C_0$. Therefore, the device discriminates against non-coincident pulses.

Now consider electrical impulses initially coincident at terminals 25 and 27, the input to lines $l_1$ and $l_2$. These may be such as are illustrated in Fig. 5. These reach junction A in timed relationship as shown in Fig. 6, the portion of each impulse transmitted over line $l_3$ arriving earlier at B by a time $1/2f_0$ seconds than the portion of each impulse transmitted over line $l_4$, as illustrated in Fig. 7. Thus at junction B initially appears an impulse 30, then $1/2f_0$ seconds later two simultaneous impulses 32 and 34 and $1/2f_0$ seconds thereafter an impulse 36. If junction B transmitted linearly to $l_5$, the resultant transmission would be three pulses, the intermediately timed one consisting of two components, each in shape and amplitude conforming to one or the other of the extreme ones. Thus each of the intermediately timed component pulses paired with one extreme one would, on frequency analysis, as explained hereinbefore, show a frequency null at the frequency $f_0$ to which the receiver is tuned. Therefore, the two pairs additively would produce no resultant count because the receiver would reject all other frequency components.

However, junction B is not linear. In this case, it is known that the rectifier response is considerably greater, proportionately, for greater amplitudes of applied voltages than for lesser amplitudes. The resultant impulses as passed by the rectifier along line $l_5$ to receiver $R_c$ are roughly shown at the top line of Fig. 8. The resultant impulse of Fig. 8 may be derived from those of Fig. 7 by adding the impulses shown in the latter, maintaining their time relationship, and giving emphasis to the portions of greater amplitude beyond that of direct proportionality. Now these three impulses fed to the receiver, and of the shape shown at the top line of Fig. 8, may be considered as composed of three sets of impulses, those of lines $a$, $b$, and $c$ respectively of Fig. 8. The impulses of line $a$ are a pair, identical in shape and amplitude and separated by a time $1/2f_0$ seconds. The impulses of line $b$ of Fig. 8 similarly consist of a pair of impulses identical in shape and amplitude and separated by $1/2f_0$ seconds in time. As mentioned hereinbefore, these two pairs will produce no response in receiver $R_c$ tuned to $f_0$. Due now to the non-linearity of the device at junction B, however, there is a third transient group consisting of a single component impulse shown at line $c$ of Fig. 8. In general this third group consisting of a single pulse will contain the frequency to which the receiver is tuned. Since the first null in the sinusoidal resolution of a single pulse occurs, if at all, at a frequency greater than $1/\lambda$ where $\lambda$ is the duration of the pulse, there will be a component of the pulse at the frequency $f_0$. It is in fact essential that $1/\lambda > 2f_0$ in order that the pulse should not form a coincidence with itself. I prefer that receiver $R_c$ be a superheterodyne receiver. When the frequency component of frequency $f_0$ (and in the immediate neighborhood thereof) is present, the receiver may pass a short train of sinusoidal oscillations at the R.-F. and I.-F. stages. Then the counter, or any suitable response circuit, may count the passage of this frequency component, as by a suitable detector. Although I prefer a superheterodyne receiver, it is obvious that other forms will be operable in suitable cases. A simple filter, or, perhaps an R.-F. amplifier, with a simple detector of the rectifying type, may be used. The counter then counts the detected responses.

From what has been said heretofore, it is apparent that this preferred embodiment of the invention comprises a method and a device for practicing the method, for the detection of coincident impulses and the rejection of non-coincident impulses, in which method a pair of impulses is derived from each initial impulse, each one of a pair being of substantially the same shape with and equal in amplitude to that of the other of the same pair. Each such pair has a null frequency which enables its rejection by a receiver unless accompanied by another pair, derived from a coincident initial pulse, in which case the double pair, when passed through a non-linear impedance and arriving with a time-spacing of $1/2f_0$, contains a frequency component at the otherwise null frequency, which latter component is detected to produce a count for the initially coincident pulses. It will be further apparent that the method and the device will determine the timed occurrence of initial impulses, if they are properly spaced in time interval at the first junction. Thus, the incidence of pulses a given time apart may be determined by arranging the line lengths to have these impulses arrive at the first junction the desired interval $1/2f_0$ seconds apart in time. Hence the term "coincidence counter" is herein and in the claims intended to include such a line length modification, wherein the occurrence of pulses of predetermined time separtion, which may be zero, are counted. The resultant count is substantially independent of pulse shape or amplitude.

It may be noted in passing that the device of Fig. 1 may have certain responses, which may be termed accidental responses to impulses not initially coincident. Thus, if the initial impulses are accidentally spaced apart with the impulse at the terminal of the longer line $l_2$ of Fig. 1 occurring $1/f_0$ seconds ahead of the impulse at the terminal of line $l_1$ and arriving at junction A, $1/2f_0$ seconds ahead of the other impulse, an accidental response or count will result. Such accidental impulses may be disregarded as a rule. Even when the type of work in which my invention is employed is such that accidental responses cannot be statistically ignored, their comparative frequency may often be calculated. Thus by computation the ratio of the desired to the undesired count can often be computed by methods known in the study of probability and statistics. It is possible that the desired count shall include the number of impulses having a desired initial time difference between the initial impulses. It is obvious that a suitable relationship between line lengths $l_2$ and $l_1$ will furnish such counts. Lines $l_1$, $l_2$, $l_3$, $l_4$ and $l_5$ should be greater than a half of a transmission line wavelength at the specified frequency $f_0$, and the pulses should have a maximum width less than a half period of $f_0$.

Referring now to Fig. 9, the transmission lines $l_1$ and $l_2$, $l_3$, and $l_4$ are open-wire transmission line. The difference in line lengths respectively between $l_1$ and $l_2$ and between $l_3$ and $l_4$ is $\lambda_0/2$ where $\lambda_0$ is the wavelength corresponding to $f_0$. Resistors $R_3$ and $R_4$ have resistances approximately equal to the characteristic impedance of lines $l_3$ and $l_4$, assumed equal, junction B, at which lines $l_3$ and $l_4$ terminate, comprises a non-linear impedance, in this case a triode T. It may however be a crystal as in Fig. 4, or a copper oxide rectifier. The grid resistor $R_g$ may be chosen to have a value so great that it has no appreciable effect as a shunt across the line. A B+ supply is inserted between plate and cathode. The tube T is preferably chosen of minute size to minimize transit time effects. Receiver $R_c$ is inserted to receive the tube output signals and counter $C_0$ receives the output of $R'_c$.

The operation of the embodiment of Fig. 9 will be apparent from what has been said in connection with Fig. 1. From an electrical impulse arriving over $l_1$ and $l_2$ is derived at junction A', a pair of impulses spaced apart $\frac{1}{2}f_0$ seconds arriving at junction B'. When one pair arrives $\frac{1}{2}f_0$ seconds at B' in advance of another pair, the frequency component $f_0$ will be present in the output from B' fed to $R'_c$, and thus counter $C'_0$ will be actuated. If this impulse spacing is not preserved, the counter $C'_0$ is not actuated.

The theory of the preferred embodiment of my invention is more fully discussed in my paper published in the Review of Scientific Instruments and mentioned hereinbefore. Even though said paper contains some typographical errors, the theory will be clear to those skilled in the art. For example, at p. 913 of the publication, Formula 12, should read:

$$A'_1 = \frac{1}{2}(A_1 + A_2)$$
$$A'_2 = \frac{1}{2}(A_2 - A_1)$$
$$A'_3 = \frac{1}{2}(A_3 + A_4)$$
$$A'_4 = \frac{1}{2}(A_4 - A_3)$$

instead of reading as published. The said paper, furthermore, contains design data and advice of value to those who desire to practice the invention.

Attention is especially directed to an important feature of Fig. 1. It will be noted that junction B in combination passes frequency components otherwise absent from the pulse combinations by virtue of the fact that when one of a pair of pulses arriving at time differences of $\frac{1}{2}f_0$ is combined with another pair similarly time-spaced, and with just one pulse of each pair arriving at B coincidentally, a certain resultant frequency component appears at the output of the receiver $R_c$. This resultant component would be absent were the feed to the filter linear in character.

Attention is also especially directed to the nature of the junction A. This junction has properties which cause internally reflected waves arising from non-coincident pulses, i. e. pulses reflected by junction B to junction A and then back to junction B, to arrive at junction B as a pattern of pulses having no frequency component at the frequency $f_0$. As will be apparent from my paper, mentioned hereinbefore, this junction has a certain type of symmetry about a plane through the input lines at the junction. It also has certain desirable properties resulting from the inclusion of the resistors $R_1$ and $R_2$. These properties resulting from symmetry and the resistors may be characterized in various ways. One way is to say that if a wave arrives at the junction network leading to the output lines along any one of the four lines joined by the junction, the transmitted impulse along the output lines $l_3$ and $l_4$ will be of the same shape and of equal amplitude. Another way of characterizing the type of junction required to obtain this result is to say that the scattering matrix S, having elements $S_{ij}$, for the four termination junction network, has $S_{i3} = S_{i4}$ using the notation of the said paper. The scattering matrix of a junction network may be defined in the following manner. Let $a_i$ be an incident wave over the $i^{th}$ line and let $b_j$ be the resultant wave transmitted from the junction over the $j^{th}$ line. It can then be shown that a scattering matrix $S_{ij}$ exists, which characterizes the junction and satisfies the matrix equation $B = S \cdot A$ in matrix notation. Since $S_{ij} = S_{ji}$ always for a linear junction network it may be also said that $S_{3j} = S_{4j}$. Thus the last two columns (or rows) of the scattering matrix of the junction are identical. It is understood, of course, that trivial solutions are barred. The terminating resistors $R_1$ and $R_2$ have been chosen to secure for the junction A such a characterizing matrix. It will be understood by those skilled in the art that other junction networks may be devised which will produce on two output lines impulses equal in amplitude and of like shape as the resultant of an impulse reaching the junction via one of two input lines. The values chosen for the particular terminations at junction A used in the embodiment of Fig. 1 are particularly recommended for their simplicity and ease of construction, as well as for their fulfillment of the required conditions for the junction.

The use of two-conductor line is highly preferred because the phase constant is substantially independent of frequency, and even in coaxial line, a band of frequency components sufficient to practice the invention with ease is afforded having phase constant independent of frequency. However, hollow pipe wave guide can be used, in which case due consideration must be given to the pulse distortion in pulse travel along the line due to the frequency dependency of the phase constant. To avoid complications resultant from such serious pulse distortion, I highly recommend the use of two-conductor lines. In some instances, the group of pulses not to be counted will have a non-zero amplitude minimum at the specified frequency, rather than a true null, a certain amount of amplitude discrimination may then be utilized in the receiver to reject groups having such minima, and to count only groups whose lowest frequency minimum amplitude occur at a greater frequency. One may say that the theory so far discussed herein proceeds on the basis of idealized transient pulse forms. The ideal is fulfilled in practice, not with perfection, but with a sufficient degree of accuracy to give operability to those forms of the invention herein disclosed.

Referring now to Fig. 10, which is a schematic diagram of another embodiment of the invention, 41 and 42 are two two-conductor transmission lines leading to a junction network 44. A similar transmission line 46 leads from the junction network 44 to a non-linear impedance 48 which is connected by transmission line 50 to receiver 52, which may include an amplifier, tuned to the frequency $2f_0$. Receiver 52 is connected to a counter 54 which receives the output therefrom.

Lines 41 and 42 receive impulses from two sources respectively (not shown). These impulses are illustrated in idealized rectangular form at lines 10a and 10b. The impulses are presumed to have a substantially the same time width of $\frac{1}{2}f_0$ seconds. It is assumed that the impulses are opposed in polarity, or at least that on transmission through the junction network to line 46 they have opposite polarities. The non-linear impedance characteristic in this instance may be chosen to pass impulses of one polarity, and otherwise to pass the impulses of the one polarity substantially linearly.

In operation, let it be assumed first that a single impulse arrives at the impedance 48 after passage through the junction network 44 along line 46. If the impulse is of a polarity to pass through impedance 48, no frequency component of the electrical impulse will pass through the receiver 52 which is tuned to the frequency $2f_0$, because the idealized impulse has a time width of $\frac{1}{2}f_0$ seconds and a frequency null at the frequency $2f_0$. Accordingly, the counter will not be actuated. Now let the transmission lines 41 and 42 have different lengths so that, with impulses initially coincident as shown in Figs. 10a and 10b, at the input to lines 41 and 42, the impulses arriving at the junction network will be separated in time by $\frac{1}{4}f_0$ seconds. The impulses then arrive at the junction in time relationship as shown in Figs. 10c and 10d. Due to the non-linear characteristic chosen for impedance 48, the receiver receives only a single impulse of width $\frac{1}{4}f_0$ seconds. Such an impulse has an appreciable frequency component at the frequency $2f_0$ to which the receiver is tuned. Accordingly, the counter will be actuated. It will be obvious that the circuit of Fig. 10 discriminates in favor of initially coincident impulses although there may be accidental coincidences or accidental time spacing of the initial impulses to which the counter will respond. It is quite apparent in this embodiment of the invention that it is preferable that the frequency of occurrence of the impulses be such that the probability of coincidences is small. In other words, the time width of the impulses should be small compared to the time between impulses. Again, the impulses may have different amplitudes which will not seriously adversely affect the operation of the device, in part because of the cooperation of the non-linear impedance 48. However, they must have substantially uniform width. It has been assumed in the foregoing that the idealized impulse shown is substantially rectangular. However, it will be appreciated that even though the electrical impulses are not of an idealized rectangular shape, they may still have a shape so that on resolution into frequency components, a minimum frequency instead of a null frequency results at the critical frequency to which the filter and amplifier 52 is tuned. The device of Fig. 10 may be considered as counting pulses having substantially any degree of coincidence at the junction except exact coincidence, in which case, of course, one impulse either completely cancels the other or leaves a pulse to be passed of the original width.

Referring now to Fig. 11, two transmission lines 61 and 62 lead to a junction network 64 from which a transmission line 66 leads to a receiver 72 which is connected to feed its output to a counter 74. Electrical impulses are initiated at the end of lines 61 and 62 to lead to the junction network. These impulses may be considered of idealized rectangular form having predetermined time width of $\frac{1}{2}f_0$ seconds. The receiver 72 is tuned to a frequency $2f_0$. The lines 61 and 62 have lengths such that if impulses are initially coincident at the input to the lines that will arrive at junction network 64 with a time separation of $\frac{1}{2}f_0$ seconds, that is, the lagging edge of the impulse first to arrive at the junction network 64 is substantially coincident with the leading edge of the other impulse arriving at junction network 64. Thus, if the impulses are initially coincident, they pass out of transmission line 66 substantially as a single impulse having a time width of $1/f_0$ seconds. Assuming idealized rectangular impulses the impulse of width $1/f_0$ has a null frequency component at the frequency $f_0$. Since this is the frequency to which receiver 72 is tuned, the electrical impulses having this time relationship at transmission line 66 will not be counted by counter 74. When an impulse arrives separately, however, and has a time width of $\frac{1}{2}f_0$, its first null frequency occurs at the frequency $2f_0$, and the component of frequency $f_0$ is present. Therefore, separate impulses actuate the counter and produce a count. Thus in the embodiment of Fig. 11, the circuit discriminates against coincident impulses and in favor of nonconcident impulses. Due regard must be paid to recovery time of the circuits of the receiver and the comparative frequency of occurrence of the impulses in design of the apparatus. In the embodiment of Fig. 11, I have provided a means for discriminating against pulses of a predetermined time width and in favor of pulses substantially twice as wide as the predetermined width. The former are not counted and the latter are counted. The apparatus may be used for this latter purpose. In general, these widths must be known for the apparatus of Fig. 11.

In the practice of the invention, due attention must be given to design details. For example, the receiver, if employing a tuned circuit, should not have too high a Q, otherwise a frequency component passed thereby may produce a train of sinusoidal oscillations which will continue until the next impulse actuates it. Similarly, the recovery time of a non-linear impedance, when used, must be chosen with regard to the expected recurrence time of pulses passed through it.

What I claim is:

1. The method of counting the occurrences of a certain kind of groups among two kinds of transient groups of electrical impulses, each said group having one or more electrical impulses, the number, shape, time duration and time spacing of which are such that each group has a lowest frequency minimum amplitude component substantially greater than zero frequency in the resolution thereof into a continuous sinusoidal frequency spectrum, one kind of said groups having the said lowest frequency minimum amplitude component for each group of said one kind at a definite known frequency lower than that of any group of the other kind; said method comprising the steps of frequency selectively detecting in said groups the presence of a sinusoidal frequency component of said known frequency to the exclusion of other frequency components, and counting the occurrences of said detected frequency component, thereby to count the occurrences of the other kind of said groups of impulses.

2. The method of discriminating between the occurrence of one of two transient groups of one or more electrical impulses, the number, shape, time duration and time spacing of which are such that each said group has a lowest frequency minimum amplitude component substantially higher than zero frequency in the resolution of the group into the continuous sinusoidal frequency spectrum thereof, one of said lowest frequency minimum amplitude components being at a predetermined known frequency lower in frequency than the other; comprising the step of frequency selectively detecting the occurrence of a sinusoidal frequency component at the said known lower frequency, thereby to secure a response discriminating in favor of the occurrence of said other of said groups to the exclusion of said one.

3. The method of counting the occurrences of one of two kinds of transient groups of at least one electrical impulse, the number, shape, time duration and time spacing of the impulses of each said group being such that each said group has a lowest frequency minimum amplitude component substantially higher than zero frequency in the resolution of the group into the continuous sinusoidal frequency spectrum thereof, the said lowest frequency minimum amplitude component of said one kind of said groups being higher in frequency than the said lowest frequency minimum amplitude component of the other kind, said last-named component being at a predetermined frequency; comprising the step of frequency selectively detecting the occurrence of a sinusoidal frequency component at the said predetermined lower frequency of said lowest frequency minimum amplitude components, and counting the detected frequency component occurrences, thereby to count the occurrence of one kind of said groups.

4. The method of counting the occurrence of one of first and second kinds of transient groups of at least one electrical impulse, the number, shape, time duration and time spacing of the impulses of each group of said first kind being such that each group of said first kind has the same known predetermined lowest frequency minimum amplitude component substantially higher than zero frequency in the resolution of the group into the continuous sinusoidal frequency spectrum thereof; the number, shape, time duration and time spacing of the impulses of each group of said second kind being such that each of the second kind of said groups has a lowest frequency minimum amplitude component at a higher frequency than said known frequency; comprising the steps of frequency selectively receiving both said groups to detect predetermined frequency components having frequencies in the immediate neighborhood of said known frequency and to exclude from detection other frequency components, and counting the occurrence of the detected predetermined frequency components.

5. The method of securing a response to the occurrence of two initial transient electrical impulses separated by a predetermined time interval including zero therebetween, comprising the steps of deriving from one of said electrical impulses a first transient group of electrical impulses, deriving from the other initial impulse a second transient group of electrical impulses, spacing in time and combining non-linearly said derived groups to produce a third transient group, and receiving said third group of impulses to detect frequency components having a known predetermined frequency and to exclude from detection other frequency components, thereby to secure a response to the occurrences of said initial impulses with said predetermined time interval therebetween.

6. The method of counting the occurrence of two initial transient electrical impulses of predetermined time interval separation, comprising the steps of deriving from one of said electrical impulses a first transient group of at least one electrical impulse, deriving a second transient group of at least one electrical impulse from the other initial impulse, spacing in time and combining non-linearly said derived groups to produce a third transient group of at least one electrical impulse, receiving said third group of impulses to detect frequency components of a predetermined frequency and to exclude from detection other frequency components, and counting the number of occurrences of the detected frequency components to count the occurrence of said initial impulses of said predetermined time separation.

7. The method of obtaining an electrical signal in response to initial transient electrical impulses of predetermined time separation, comprising the steps of deriving from each of said initial impulses a pair of electrical impulses with the pairs being time spaced by $\frac{1}{2}f_0$ seconds for initial impulses of the predetermined time separation and with each derived impulse of one pair being substantially the same in shape and amplitude as and being time-spaced by $\frac{1}{2}f_0$ seconds from the other impulse of the same pair, deriving a non-linear electrical response to the pairs of said derived impulses, and receiving the said response to detect only sinusoidal frequencies in the neighborhood of $f_0$ cycles per second, whereby an electrical signal is obtained in response to initial impulses of said predetermined time separation.

8. The method of counting the occurrence of initial transient electrical impulses of predetermined time separation, comprising the steps of deriving from each of said initial impulses a pair of electrical impulses, one derived pair being substantially identical in shape and amplitude with and separated from the other derived impulse of the same said pair by $\frac{1}{2}F_0$ seconds in time, deriving the electrical response of a non-linear impedance to the pairs of said derived impulses, receiving the response of said non-linear impedance to detect only sinusoidal frequencies in the neighborhood $F_0$ cycles per second, and counting the occurrence of said detected frequencies, thereby to count the occurrence of said initial impulses of predetermined time separation.

9. The method of counting the coincidences of initial transient electrical impulses from two sources, comprising the steps of delaying the impulses from one source by $\frac{1}{2}F_0$ seconds longer than the impulses from the other source, deriving from each delayed impulse a pair of electrical impulses, each impulse of one pair being substantially the same in shape and amplitude as the other impulse of the same pair, delaying one impulse of each pair by $\frac{1}{2}F_0$ seconds longer than the other impulse of the same pair, thereafter deriving the electrical response of a non-linear impedance to the delayed pairs of impulses, and receiving the said response of said non-linear impedance to detect only sinusoidal frequency components in the immediate neighborhood of $F_0$ cycles per second, and counting the detected responses thereby to derive a count of the initial coincidences between said impulses.

10. In an electrical device, a source of two kinds of transient groups of electrical impulses, the number, shape, time duration, and time spacing of the impulses of each group of one kind being such that each said group of said one kind has a lowest frequency minimum amplitude component at a known predetermined frequency substantially higher than zero frequency in the resolution of the group into the continuous sinusoidal frequency spectrum thereof; the number, shape, time duration, and time spacing of the impulses of each group of the other kind being such that each said group has a lowest frequency minimum amplitude component at a frequency higher than said known frequency in the resolution of the group into the continuous sinusoidal frequency spectrum thereof; and a receiver connected to said source to receive said groups, said receiver being tuned to said known predetermined frequency, thereby to derive a receiver response to the occurrence of groups of said other kind to the exclusion of groups of said one kind.

11. An electrical counter comprising a source of two kinds of transient groups of electrical impulses, the number, shape, time duration, and time spacing of the impulses of each group of one kind being such that each said group of said one kind has a lowest frequency minimum amplitude component at a known predetermined frequency substantially higher than zero frequency in the resolution of the group into the continuous sinusoidal frequency spectrum thereof; the number, shape, time duration, and time spacing of the impulse of each group of the other kind being such that each said group has a lowest frequency minimum amplitude component at a frequency higher than said known frequency in the resolution of the group into the continuous sinusoidal frequency spectrum thereof; a receiver connected to said source to receive said groups of impulses and being tuned to said known predetermined frequency and comprising a detector; and a counter connected to said detector to receive and count the responses thereof, thereby to count the occurrences of groups of said other kind to the exclusion of groups of said one kind.

12. An electrical counter comprising a source of two kinds of transient groups of electrical impulses, the number, shape, time duration, and time spacing of the impulses of each group of one kind being such that each said group of said one kind has a lowest frequency minimum amplitude component at a known predetermined frequency substantially higher than zero frequency in the resolution of the group into the continuous sinusoidal frequency spectrum thereof; the number, shape, time duration, and time spacing of the impulses of each group of the other kind being such that each said group has a lowest frequency minimum amplitude component at a frequency higher than said known frequency in the resolution of the group into the continuous sinusoidal frequency spectrum thereof; a receiver connected to said source to receive said groups of impulses and being tuned to said known predetermined frequency; and a counter connected to said receiver to count the responses thereof, thereby to count the occurrences of groups of said other kind to the exclusion of groups of said one kind.

13. A pulse coincidence counter to count electric impulses having a predetermined initial time separation and initiated from each of two sources and comprising a first transmission line connected to one of said sources, a second transmission line connected to the other of said sources, a junction network, a third transmission line joined to said first two transmission lines through said junction network, a receiver connected to said third transmission line and tuned to a known frequency, a counter connected to said receiver to count the responses thereof to frequency components of said known frequency received through said third transmission line.

14. The counter claimed in claim 13, said transmission lines being two-conductor lines.

15. An electrical impulse counter to count impulses of predetermined time width initiated at each of two sources with any other than a predetermined time separation, comprising two transmission lines, one connected to each of said sources, said lines having a difference in electrical lengths to cause said electrical impulses to arrive at the line terminations with the lagging edge of one substantially coincident with the leading edge of the other of two electrical impulses initiated with the desired time separation, a junction network, a third transmission line, a receiver connected to said two transmission lines through said third transmission line and thence through said junction network, said receiver being tuned to a frequency equal to the inverse of the time width of said impulses and connected to receive said impulses with like polarity, and a counter connected to said receiver to count the output thereof and thereby to count the occurrence of initial impulses of said predetermined known width initiated at said sources with other than said predetermined time spacing.

16. The counter claimed in claim 15, said transmission lines being two-conductor lines.

17. A pulse coincidence counter comprising two transmission lines each connected to a source of uni-directional transient electrical impulses of known predetermined time width, a linear junction network, a non-linear impedance connected to said junction network to receive said impulses with those from one source in reverse polarity from those of the other source, said non-linear impedance passing received signals of one polarity substantially linearly and substantially blocking signals of reverse polarity, a receiver connected to said non-linear impedance to receive the passed signals therefrom and being tuned to a frequency substantially equal to the inverse of said known time width, and a counter connected to said receiver to receive the response thereof, thereby to count electrical impulses arriving at said junction in substantially any degree of coincidence except exact coincidence.

18. The counter claimed in claim 17, said transmission lines being two-conductor lines.

19. An electrical counter comprising a source of two kinds of transient groups of electrical impulses, the number, shape, time duration, and time spacing of the impulses of each group of one kind being such that each said group of said one kind has a lowest frequency minimum amplitude component at a known predetermined frequency substantially higher than zero frequency in the resolution of the group into the continuous sinusoidal frequency spectrum thereof; the number, shape, time duration, and time spacing of the impulses of each group of the other kind being such that each said group has a lowest frequency minimum amplitude component at a frequency higher than said known frequency in the resolution of the group into the continuous sinusoidal frequency spectrum thereof; a receiver having an input connected to said source to receive said transient groups of impulses and being tuned to said known predetermined frequency to detect the presence at the input of a sinusoidal frequency component at said known frequency and having a detected output responsive to said known frequency component presence, and a counter connected to said receiver to respond to said output, thereby to count groups of said other kind to the exclusion of groups of said one kind.

20. In a pulse coincidence circuit, the combination comprising a first pair of input transmission lines, a second pair of transmission lines, a junction network between said first and second pairs of transmission lines, a fifth transmission line, and a second junction network between said fifth transmission line and said second pair of transmission lines and comprising a non-linear impedance.

21. The coincidence circuit claimed in claim 20, said transmission lines being two-conductor lines.

22. The combination claimed in claim 20, further comprising a receiver tuned to receive a sinusoidal component of predetermined frequency and connected to said fifth transmission line.

23. The combination claimed in claim 20, said junction network between said first and second pair of transmission lines being characterized by a scattering matrix S having components $S_{ij}$ determined by the matrix equation $B = S \cdot A$, wherein the symbol · indicates matrix multiplication, A having matrix components $a_i$, B having matrix components $b_i$, $a_i$ representing an incident wave in the $i^{th}$ line, $b_j$ representing the resultant transmitted wave in the $j^{th}$ line, the first said pair of lines being the first and second lines, and the second said pair of lines being the third and fourth lines, $i$, and $j$ taking values 1, 2, 3, and 4.

24. A pulse coincidence circuit, comprising a first pair of two-conductor input transmission lines, a second pair of two-conductor transmission lines, a junction network between said first and second pair of transmission lines, a fifth two-conductor transmission line, a second junction network, a non-linear impedance, a tuned receiver having an input connected to said second junction network through said non-linear impedance and having an output, and a counter circuit connected to said output.

25. In a pulse coincidence circuit, a pair of two-conductor transmission lines each having input and output ends, a third two-conductor transmission line, a junction network including a non-linear impedance between said output ends of said pair of transmission lines and said third transmission line, and a receiver having a predetermined passband of frequencies at a predetermined frequency $f_0$ cycles per second connected to said third transmission line, the lengths of said lines having a difference predetermined in relation to the frequency $f_0$ cycles per second and in relation to the time separation of those pulses at the input end to be selectively detected.

26. A circuit to derive a response to pulses coincident at two pulse sources and comprising a pair of two conductor transmission lines, one being connected to one of said sources and the other being connected to the other of said sources, a second pair of two conductor transmission lines, a linear junction network joining said lines, one of each of said pairs being longer than the other line of the same pair by one half the transmission line wave length at a predetermined frequency, a second junction network including a non-linear impedance, a fifth transmission line connected to said second pair of transmission lines through said non-linear impedance and said second junction, and a receiver tuned to said predetermined frequency and connected to said fifth transmission line, whereby the receiver has a response to pulses coincident at said sources.

27. A pulse coincidence circuit to count pulses coincident at two pulse sources and comprising a pair of two conductor transmission lines, one being connected to one of said sources and the other being connected to the other of said sources, a second pair of two conductor transmission lines, a linear junction network joining said lines, one of each of said pairs of lines being longer than the other line of same pair by one half the transmission line wavelength at a predetermined frequency, a second junction network including a non-linear impedance, a fifth transmission line connected to said second pair of transmission lines through said non-linear impedance and said second junction, a receiver having an input connected to said fifth transmission line and having an output, and a counter connected to said output at said receiver.

28. The coincidence counter claimed in claim 27, said junction network between said first and second pair of transmission lines being characterized by a scattering matrix S having components $S_{ij}$ determined by the matrix equation $B = S \cdot A$, wherein the symbol · indicates matrix multiplication, A having components $a_i$, B having components $b_i$, $a_i$ representing an incident wave in the $i^{th}$ line, $b_j$ representing the resultant transmitted wave in the $j^{th}$ line, the first said pair of lines being the first and second lines, and the second pair of lines being the third and fourth lines, $i$ and $j$ taking values 1, 2, 3, and 4.

29. The counter claimed in claim 28, said receiver being a superheterodyne receiver.

30. The receiver claimed in claim 28, each of said transmission lines having a length greater than one fourth of said wavelength at said predetermined frequency, the pulses from said sources each having a maximum time width less than one half a period of said frequency.

31. The counter claimed in claim 27, said linear junction network comprising carbon resistor terminations of said second pair of lines at the junction and in series with each of said second pair of lines, each of said resistors having a resistance equal to the characteristic impedance of said lines, the characteristic impedance of each line of said two pairs of lines being equal.

32. The counter claimed in claim 27, said lines being coaxial transmission lines, each of said first and second lines having a characteristic impedance equal to that of each other said line, said linear junction network comprising two carbon resistors one in series connection with each center conductor of said second pair of lines and each resistor having a resistance equal to said characteristic impedance and directly contacting the center conductors of said first pair of lines at a common directly connected junction point.

33. The counter claimed in claim 27, said non-linear impedance being a crystal rectifier.

ROBERT H. DICKE.

References Cited in the file of this patent

UNITED STATES PATENTS

| Number | Name | Date |
| --- | --- | --- |
| 2,408,079 | Labin | Sept. 24, 1946 |
| 2,428,913 | Hulst | Oct. 14, 1947 |
| 2,434,937 | Labin | Jan. 27, 1948 |
| 2,440,278 | Labin | Apr. 27, 1948 |
| 2,441,598 | Robertson | May 18, 1948 |

OTHER REFERENCES

"Radioactivity and Nuclear Physics," J. M. Cork, University of Michigan, Ann Arbor, Michigan, 1946; Figure 17, page 27.